United States Patent [19]

Voss

[11] Patent Number: 5,030,049
[45] Date of Patent: Jul. 9, 1991

[54] TOOL-OUTFITTED TURN BROACHING MACHINE

[75] Inventor: Wolf-Dieter Voss, Erlengrund, Fed. Rep. of Germany

[73] Assignee: Boehringer Werkzeugmaschinen GmbH, Goeppingen, Fed. Rep. of Germany

[21] Appl. No.: 466,896

[22] Filed: Jan. 18, 1990

[30] Foreign Application Priority Data

Jan. 25, 1989 [DE] Fed. Rep. of Germany ....... 3901888

[51] Int. Cl.⁵ .............................................. B23D 37/14
[52] U.S. Cl. .............................. 409/282; 51/105 SP; 409/199; 409/287
[58] Field of Search ............... 409/199, 203, 217, 281, 409/282, 286, 287, 190, 231, 232, 268; 51/105 SP; 82/106

[56] References Cited

U.S. PATENT DOCUMENTS

| | | | |
|---|---|---|---|
| 4,242,020 | 12/1980 | Schmid | 82/106 |
| 4,309,134 | 1/1982 | Schmid | 409/199 |
| 4,423,990 | 1/1984 | Kodama et al. | 409/203 |
| 4,790,698 | 12/1988 | Heffron | 51/105 SP |
| 4,799,839 | 1/1989 | Berstein et al. | 409/287 |

FOREIGN PATENT DOCUMENTS

| | | | |
|---|---|---|---|
| 134289 | 11/1978 | Japan | 82/106 |
| 143903 | 8/1983 | Japan | 82/106 |

Primary Examiner—Daniel W. Howell
Attorney, Agent, or Firm—Dykema Gossett

[57] ABSTRACT

A turn broaching machine can be used either as a single turn broaching machine or as a set turn broaching machine with a minimal retooling expense by employing two independently movable tool supports into which either a single turn broaching tool or a turn broaching tool set can be inserted, where the ends are designed so they are suitable for chucking in the chucks of the two tool supports.

15 Claims, 2 Drawing Sheets

TOOL-OUTFITTED TURN BROACHING MACHINE

TECHNICAL FIELD

This invention relates to so-called turn broaching machines.

BACKGROUND OF THE INVENTION

Turn broaching machines have recently been used to a great extent for machining crankshafts, camshafts and similar parts. The workpiece, which is usually clamped and driven on both ends, rotates rapidly, and the blades which sit on the perimeter of a disk-shaped tool are engaged on the workpiece. The disk-shaped tool rotates relatively slowly about an axle parallel to the longitudinal axis of the workpiece. The individual blades on the periphery of the disk-shaped tool may all be the same distance from the point of rotation or they may be arranged with increasing distances. In the case where the blades are arranged on an arc and are all the same distance from the point of rotation of the disk-shaped tool, the tool must be advanced in the X direction, i.e., toward the axis of rotation of the workpiece. However, if the blades are arranged so the distance from the point of rotation of the tool increases, then the advance is determined only by the rotation of the tool.

Depending on the given machining application, the blades extend over the entire periphery of the disk-shaped tool or only over a part of the circumference.

This machining principle is used especially for final machining of the bearing faces of crankshafts and camshafts because the cutting pressure acting on the workpiece is much lower than in turning, so these relatively labile workpieces are also subjected to relatively little deformation during machining. In addition, this machining process yields very good surface quality.

Thus far two different types of machines are known for performing turn broaching.

The so-called set-type machines are suitable for holding turn broaching tool sets. These are several disk-shaped individual tools which are arranged together in parallel at a certain distance and are joined by an approximately cylindrical central body with a much smaller diameter so they are all driven together. The central body can also be divided in the longitudinal direction, i.e., a plane parallel to the Z direction, just like each individual tool. The two half-shells are placed on a specially designed carrying shaft when tooling the turn broaching machine, so the carrying shaft runs in the Z direction and joins the two tool supports together in one piece. These two tool supports cannot be lengthened in their mutual position in the Z direction in a so-called set machine and this form a unit with a U-shaped outline and a fixed spacing in the Z direction. Regardless of whether only such tools whose blades have an increasing distance from the center of rotation are used, the tool support can either be moved in the X direction or not. With tool supports that cannot be moved in the X direction, the construction cost of the machine is lower, but on the other hand a specially designed tool must be created for each new application. As a rule, since the main bearing points of such crankshafts are usually aligned with each other, when they must be produced over a long period of time and in large numbers they are therefore finished in one operation.

However, if a number of different workpieces which change frequently must be machined by the turn broaching principle, so-called flexible turn broaching machines are used. These are turn broaching machines that have at least two tool supports that can be moved independently of each other in both X and Z directions, so one disk-shaped tool can be driven in each tool support.

Due to the fact that the tool supports and thus the tools can be moved in both X and Z directions, any rotationally symmetrical surfaces on a wide variety of workpieces can be machined. However, since only two tools, for example, are in use at the same time, the progress made in machining is not as fast as when four or more disk-shaped tools of a turn broaching tool set are in use simultaneously.

Thus these flexible turn broaching machines are especially suitable for machining reciprocating bearings, for remachining individual main bearings or for machining recesses at the transition from the bearing face to the cheek.

In flexible turn broaching machines, the steep taper which must be provided at the end of the spindle with the facing stop attached to it is used as the tool holding fixture which must be aligned in the Z direction, or a standardized jaw chuck is used such as that also used for a spindle head chuck. The disk-shaped tool as well as the central body to which it is attached therefore need no longer be divided in a plane parallel to the Z direction but instead the central body need only be designed on the side facing the tool support so it can be secured and chucked on the tool holding fixture.

This eliminates a number of disadvantages such as those encountered with tool sets that can be divided longitudinally as on such set machines because the half-shells used there must be placed on a specially designed carrier shaft and anchored there, i.e., they must be chucked, so an extremely precise alignment of the two shells in both X and Z directions is required for satisfactory machining results. In addition, a very high gripping power must be applied to secure the shells on the carrying shaft. On the other hand, due to the one-sided chucking of a disk-shaped tool and its central body in a jaw chuck, there cannot be any bilateral chucking of the tool or central body with all the resulting disadvantages.

SUMMARY OF THE INVENTION

Therefore, the purpose of the present invention is to create a tool-outfitted turn broaching machine that can be used either as a set machine or as a flexible turn broaching machine depending on the given machining application, with disk-shaped tools that can be moved individually.

This problem is solved by the fact that with the turn broaching machine according to this invention, at least two tool supports must be present and can be moved in both X and Z directions independently of each other as in the flexible turn broaching machine. It is most advantageous for each tool support to consist of an upper support and a lower support, in which case the upper support has the drivable chuck to receive the tool and can be moved in the X direction on the lower support, which in turn can be moved in the Z direction on the bed of the turn broaching machine.

At the same time, however, it must be possible to synchronize the movements in the X direction. This may involve either electric synchronization, in which case either the longitudinal movements of the supports in the X direction or the rotational movement of the driving spindle for the corresponding longitudinal movement are monitored and synchronized by electric pulse generators, or it may involve so-called mechanical synchronization, whereby the driving elements of the two supports, e.g., the driving spindles, are connected by a vertical shaft in order to assure that the two supports can only move in the X direction in synchronization.

In addition, if there are at least two tool supports and the tool holding fixtures for the individual disk-shaped tools point in the direction of the other tool support, then the two tool supports can be mounted in a position so they are aligned with each other in the Z direction in order to use them in a turn broaching tool set which is held with each of the opposite ends in the tool holding fixtures of the two tool supports. This is possible due to the fact that at least one of the two tool supports can be moved in the Z direction in order to permit use of the turn broaching tool set in one fixture, and then by reducing the distance between the supports, the second tool holding fixture can be brought into contact with it.

Therefore, the turn broaching tool set need no longer be divided in the longitudinal direction together with the central body as is necessary when used in traditional set machines. This also eliminates all the associated disadvantages of an extremely precise tool assembly with regard to alignment of the two shells relative to each other and chucking the shells of an internal carrying shaft. Now it is necessary only for the central body of the turn broaching tool set carrying the individual disk-shaped tools to be designed at its ends so it can be held in the tool holding fixtures used on the supports. The ends of the central body must thus be adapted to the steep cones at the ends of the driving spindles, or when using jaw chucks they must have cylindrical peripheral surfaces.

Then a number of individual disk-shaped tools can be placed on this central body as is intended with turn broaching tool sets, and their mutual positions in the Z direction can be adjusted as needed in a given case. On the other hand, the machine can be used as a traditional flexible turn broaching machine after shutting down the synchronization of the X movements of the tool supports, in which case a disk-shaped tool and its central body are placed in each of the two fixtures. In addition, however, it is also possible to insert a central body between the two aligned chucks of the two tool supports in those cases when the highest possible accuracy is necessary instead of the fastest possible machining, in this case the central body being thus secured very stably on both sides, and then only a single disk-shaped tool needed at that time is placed on this central body. Especially with a small axial length of this central body, this results in a very stable tool mount with precise machining results accordingly.

In comparison with traditional set machines, the machine according to this invention also offers the advantage of using a different set tool which, for example, has a central body with a larger or smaller axial length. Thus, it is necessary only to change the distance between the two supports, whereas with traditional set machines, a relative change in position of the parts of the support was impossible. Instead, the support on the turn broaching machine had to be replaced in order to permit retooling to the desired new spacing. Quite apart from this high retooling cost and the difficulties in assembling the two shells of the set so they are aligned, the equipment needed for the individual and independently controllable chucking of the two shells of the set was also much more expensive than the tool holding fixtures used in the present case which involve only the standardized design of the spindle ends where the steep cone and facing stop are supplemented only by a suitable chucking design (manual or hydraulic).

BRIEF DESCRIPTION OF THE DRAWINGS

One practical example according to this invention is described in detail below with reference to the accompanying drawings, wherein.

DESCRIPTION OF THE PREFERRED EMBODIMENTS

Figure 1:
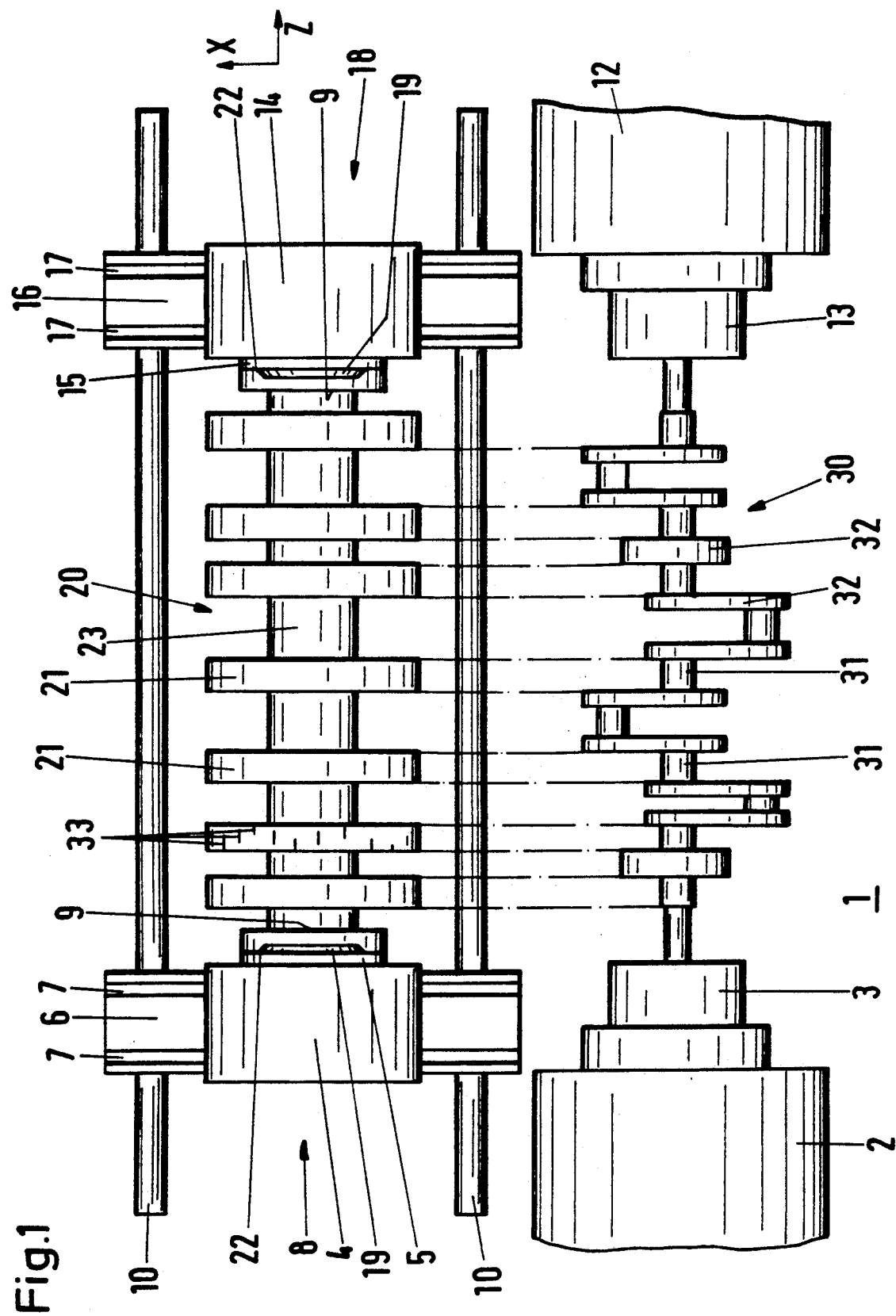
FIG. 1 is a top view of a turn broaching machine according to the present invention.

All the units shown in FIG. 1 are mounted on bed 1 of the turn broaching machine according to this invention. At the front can be seen an arbitrarily designed crankshaft 30 as the workpiece whose ends are clamped in clamping chucks 3 and 13 of the opposite spindle heads 2 and 12 and can be driven rotationally. Of course, the rotation of the two spindle heads 2 and 12 must be synchronized in a known way, i.e., either electrically or mechanically, in order to prevent torsion on the chucked crankshaft 30 during rotation. When the main bearings 31 including the end bearing pin of crankshaft 30 are to be machined, it is appropriate to machine these aligned bearings together during a single machining step by means of an adapted turn broaching tool set 20. This turn broaching tool set 20 is arranged parallel to crankshaft 30 and consists of a central body 23 with an approximately cylindrical cross-section on which a number of disk-shaped tools 21 corresponding to the machining sites are mounted parallel to each other and secured. A number of individual blades 33, which are engaged at the machining site, are provided on the periphery of each of these disk-shaped tools 21. The axial positions of the individual disk-shaped tools 21 as well as their width depend on the mutual position and the width of the machining sites on the workpiece, i.e., in this case the main bearing faces of crankshaft 30. Simultaneously with main bearing sites 31, the adjacent faces of the cheeks 32 of the crankshaft are usually also machined in approaching the workpiece.

In order to prevent contact with the eccentric parts of the crankshaft, the diameter of central body 23 is of course much smaller than that of the disk-shaped tools 21.

This central body 23 is designed at its opposite ends 9 so it can be chucked by tool holding fixtures 5 and 15 of tool supports 8 and 18. As a rule, this is the standardized form at the end of the driving spindles which consist of a steep cone 19 and a facing stop 22. At these ends, central body 23 is secured by simply bolting it in position or by means of hydraulic chucking devices, disclosed below, which are arranged in the interior of the driving spindles.

Each of the two tool supports 8 and 18 consists of an upper support 4 and 14 which can move in the X direction along parallel guides 7 and 17 on the respective lower supports 6 and 16. This movement of the upper supports 4 and 14 in the X direction must have a means for optional synchronization such as the known means of electric or mechanical synchronization. Guides 7 and 17 running parallel to the X direction need not run horizontally but instead may also be inclined or even vertical.

The two lower supports 6 and 16 can also be moved along two parallel guides 10 in the Z direction. These two guides which provide guidance along the Z direction need not be located at the same level next to each other but can also be at different heights. The guides 10 are mounted on bed 1 of the turn broaching machine.

With this machine configuration and a suitably designed turn broaching tool set 20, the tool set can be driven in synchronization by the two chucks 5 and 15 and can be moved toward and away from the workpiece by the synchronized movement of the two upper supports 4 and 14 in the X direction while still maintaining the parallelism between the tool and the workpiece.

If the main bearings of another crankshaft or a completely different workpiece are to be machined, then after increasing the spacing in the Z direction between the two supports 8 and 18, the previous turn broaching tool set 20 can be released, and a new tool set with a larger or smaller axial length in accordance with the desired workpiece can be inserted. Likewise, the machine can be operated flexibly by chucking individual independent disk-shaped tools 21 and their central body 23 in the tool holding fixtures 5 and 15. The two supports 8 and 18 and their partial components, upper supports 4 and 14 and lower supports 6 and 16, are moved independently of each other in order to bring disk-shaped tool 21, which is mounted on them, up to the machining site desired in particular application of use.

Figure 2:
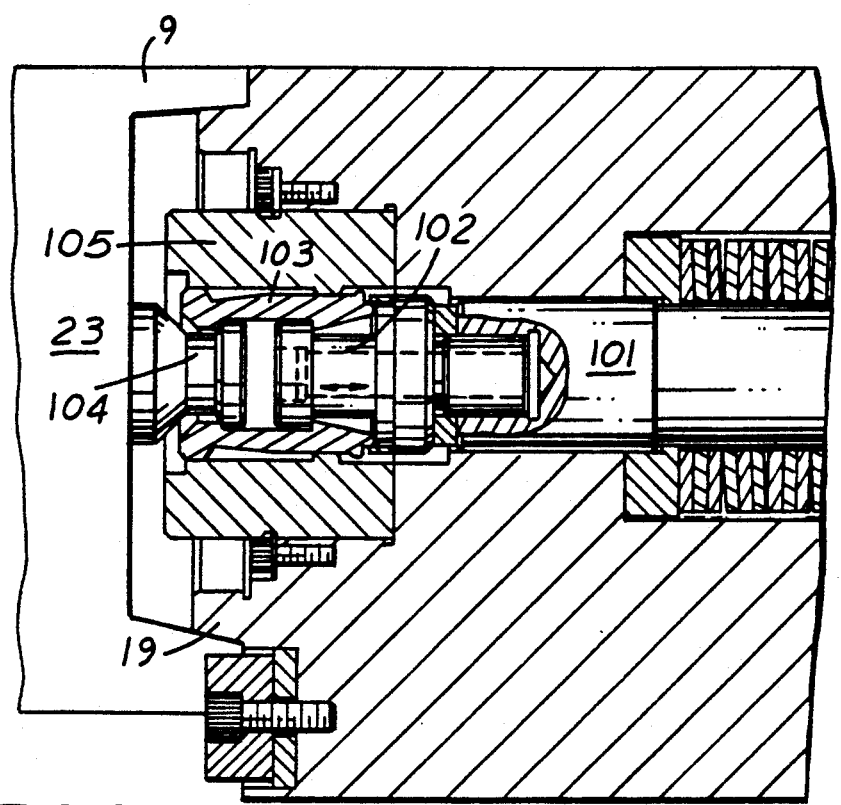
FIG. 2 is a cross-sectional view through a chuck arrangement utilized with the present invention.

FIG. 2 discloses a known chuck arrangement which may be utilized to connect central body 23 to drive spindle 19. In particular, FIG. 2 illustrates a hydraulic clutch which includes parts 101 and 102 which may move axially due to a hydraulic force, and thereby move sleeve 103 to pull member 104, which is fixed to tool body 23, into a part 105, which is fixed to spindle 19. This type of hydraulic chuck is known in the art.

Figure 3:
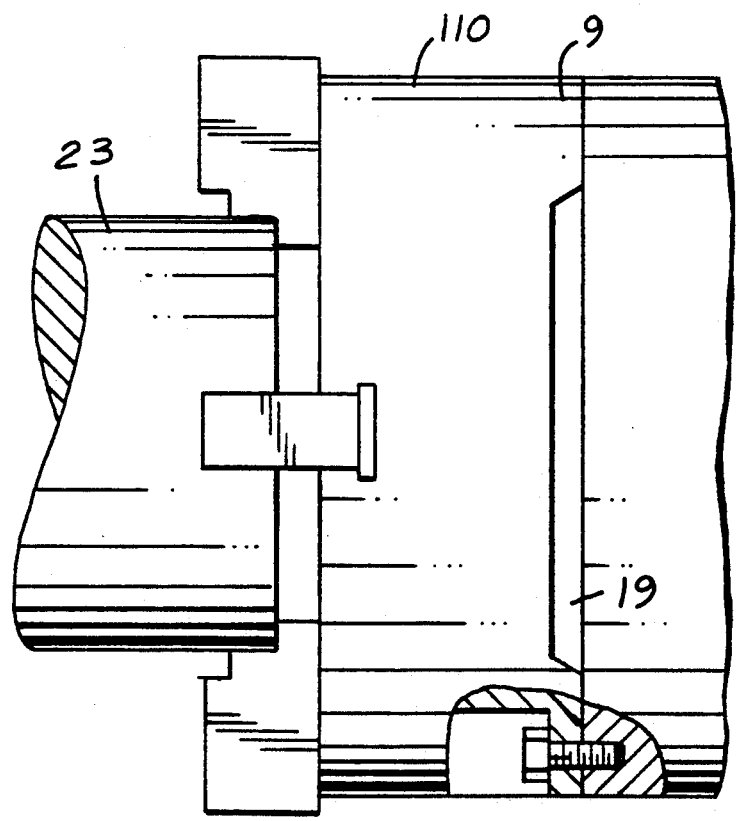
FIG. 3 is a cross-sectional view through an alternative chuck arrangement utilized with the present invention.

FIG. 3 discloses an alternative chuck which utilizes a spindle head chuck 110. The chuck is fixed to spindle 19 by screws and centered on the cone of spindle 19.

What is claimed is:

1. For use with a turn broaching machine for machining a workpiece and of the type including means for rotating the workpiece about a Z axis, a tool set comprising:
    a central body having at least one tool thereon;
    a pair of facing tool supports movable in X and Z directions respectively perpendicular and parallel to said Z axis; and
    a pair of facing, spaced tool mounts respectively on said tool supports for releasably mounting the opposite ends of said body respectively on said tool supports, said tool mounts being synchronously rotational to rotate said central body about an axis parallel to said Z axis.

2. The turn broaching tool set of Claim 1, wherein said central body is continuous between said opposite ends thereof, and said tool mounts respectively include chucks for clamping said opposite ends of said central body.

3. The turn broaching tool set of Claim 2, wherein said tool supports are synchronously movable in said X direction.

4. The turn broaching tool set of Claim 1, wherein said tool supports are synchronously movable in said X direction.

5. The turn broaching tool set of Claim 2, wherein said chucks each include a steep cone, a facing stop and clamping means.

6. The turn broaching tool set of Claim 3, wherein said chucks each include a steep cone, a facing stop and clamping means.

7. The turn broaching tool set of Claim 5, including a pair of rotatable driving spindles, and wherein said clamping means are disposed within the interior of said driving spindles.

8. The turn broaching tool set of Claim 1, including a pair of driving spindles for rotating said central body and wherein said tool mounts include hydraulic clamping means within said driving spindles for clamping the opposite ends of said central body.

9. The turn broaching tool set of Claim 1, wherein each of said tool mounts includes a jaw chuck.

10. The turn broaching tool set of Claim 9, wherein said jaw chuck is a spindle head chuck.

11. The turn broaching tool set of Claim 1, wherein said tool supports include:
    first support means shiftable in said X direction, second support means shiftable in said Z direction, and means for shiftably mounting said first support means on said second support means.

12. The turn broaching tool set of Claim 11, wherein:
    said first support means includes a pair of spaced apart, upper supports, and
    said mounting means includes first guide means on said second support for guiding the movement of said upper supports in said X direction toward and away from said workpiece.

13. The turn broaching tool set of Claim 12, wherein said second support means includes a pair of spaced apart lower supports and said tool set further includes second guide means for guiding the movement of said lower supports in said Z direction.

14. The turn broaching tool set of Claim 13, wherein said first and second guide means each includes a pair of spaced apart, parallel guides.

15. The turn broaching tool set of Claim 1, including means for adjusting the spacing between said tool mounts, whereby central bodies of differing lengths may be mounted on said tool supports.

* * * * *